United States Patent [19]

Magladry et al.

[11] 3,803,043
[45] Apr. 9, 1974

[54] POROUS METAL HYDRIDE BODIES

[75] Inventors: Robert E. Magladry; Albert L. Picha; Lennart A. Sundquist, all of Baltimore, Md.

[73] Assignee: Teledyne, Inc., Los Angeles, Calif.

[22] Filed: Apr. 21, 1969

[21] Appl. No.: 862,997

Related U.S. Application Data

[63] Continuation of Ser. No. 594,415, Nov. 15, 1966, abandoned.

[52] U.S. Cl............. 252/301.1 R, 23/348, 23/360, 23/204, 264/0.5, 264/43, 264/111, 176/92
[51] Int. Cl.......................... B29h 7/20, G21c 21/00
[58] Field of Search........ 252/301.1 R; 23/204, 348, 23/360, 366; 264/0.5, 43, 111

[56] References Cited
UNITED STATES PATENTS

| | | | |
|---|---|---|---|
| 1,835,024 | 12/1931 | Driggs | 23/348 |
| 2,446,780 | 8/1948 | Newton | 23/348 |
| 2,536,616 | 1/1951 | Warf | 23/348 |
| 2,994,587 | 8/1961 | Vose | 23/204 |
| 3,018,169 | 1/1962 | Vetrano | 23/204 |

*Primary Examiner*—Carl D. Quarforth
*Assistant Examiner*—S. R. Hellman
*Attorney, Agent, or Firm*—Fleit, Gipple & Jacobson

[57] ABSTRACT

A porous metal hydride body formed of sintered spherical metal particles having relatively high density and permeability.

6 Claims, No Drawings

POROUS METAL HYDRIDE BODIES

CROSS-REFERENCE TO RELATED APPLICATION

This application is a continuation of application Ser. No. 594,415, filed Nov. 15, 1966, now abandoned.

This invention relates to metal hydride bodies in porous form having a controlled capacity for absorbing and releasing hydrogen and to a method of producing the same. These bodies are especially useful as moderator elements in nuclear reactor applications. Other uses are where hydrogen in pure form is desired to be stored in a solid body, either in the molecular and/or elemental state or as a hydride to participate in a reaction or to supply hydrogen to a reaction.

Prior art processes have often employed massively hydrided metal bodies generally slugs, perhaps of the order of 2 or 3 cm, in linear dimensions. Rods or similar shaped bodies, in which form they are to be ultimately employed, are hydrided at temperatures in excess of 500°C. for many hours, even days. One problem with these so-called massive bodies is, that due to the low mobility of the hydrogen in the body, the hydration process proceeds in a non-uniform manner. One such hydride, for example, is zirconium hydride, employed as a fuel moderator in a nuclear reactor, which needs to have consistent hydriding throughout its body in order to offer optimum controllability of the nuclear reactor in which it is being employed.

This problem of non-uniform hydriding of bodies has been overcome by the instant process wherein the metal to be hydrided is first formed into relatively uniform spherical particles and after compacting and sintering, hydrided to result in bodies having a uniform amount of hydride throughout their volume.

It is, therefore, an object of this invention to provide uniformly hydrided metal bodies of a controlled porosity.

It is a further object of this invention to provide a process for manufacturing such porous uniformly hydrided metal bodies by the use of spheroidal particles of the metal followed by a compacting and sintering process.

Further objects and advantages will become apparent from the accompanying more particular description of the preferred embodiments of the invention and as illustrated in the specific examples.

This invention broadly relates to the making of various metallic hydrides of such metals as zirconium, uranium, yttrium, silicon, niobium, platinum, tantalum, calcium, barium, titanium and alloys thereof, and to their resultant structural form. Specifically, in the case of zirconium hydride bodies of a porous nature, they are produced by arc plasma spraying of zirconium metal so as to form substantially perfect spheroidal particles of zirconium having a mean particle size of approximately 0.008 cm. in an argon atmosphere. These spheres are then compacted in a die under ambient conditions and subjected to a pressure the order of several tons per sq. cm. to produce a green structure. Following formation of these compacts of spheroidal particles of zirconium, the green structure is vacuum sintered at a temperature close to the melting point, for the time necessary to form the desired porous bodies of zirconium. As an alternative to a vacuum, such sintering may also be conducted in inert atmospheres, such as argon, helium and xenon. After the bodies had been formulated, or even simultaneously with sintering, the hydrogen is introduced into the reaction chamber at a temperature of at least 400°C., and at pressures up to 10 atms., for a time necessary to hydride the zirconium, until no more hydrogen is taken up. This usually takes no more than a few minutes. There is no criticality with respect to the time of hydriding since it is a function rather of temperature. Following such hydriding, the zirconium bodies are cooled in hydrogen to produce a zirconium hydride composition of $ZrH_{1.8}$, approximately, with the body being approximately 80 percent of theoretical density. The resulting body is, in fact, porous as shown by a bed permeability test. The test further shows that, because of the porosity, it is able in fact, to rapidly absorb or release large amounts of hydrogen. The rate of hydrogen absorption and total amount absorbed is a function of the temperature of the body.

The particular utility of a porous structure as opposed to a non-porous and especially a solid structure for bodies such as zirconium hydride is that for particular utility in a nuclear reactor, a high mobility of hydrogen must be maintained, that is, the hydrogen has to be able to diffuse in and out of the material easily. A porous structure formed from spheroidal particles is most useful to accomplish this, since there are no sharp edges or discontinuities which present friction to hydrogen flow. The large internal surface area of a porous body makes it easier for hydrogen to enter into the hydride form through catalytic action in which the surface dissociates molecular hydrogen.

The speed with which a porous hydride body will absorb or release is inversely proportional to the particle size and density. These characteristics of the body can, of course, be controlled by employing different combinations of particle size prior to plasma spraying. Thus, a useful body will have excellent gas permeability in a Darcy range between 0.9–40.0.

A further reason for having porous bodies of hydrides is that as the material is hydrided it expands volumetrically, that is, it grows in volume by taking in hydrogen and shrinks as it loses it. Changes in volumetric size have little effect on the porous body from a stress and strain standpoint; should these bodies have, however, the usual solid non-porous forms and shapes, the stresses and strains would be such as to cause the hydride bodies to easily crack and break because of the non-uniformity of the hydriding process.

Wherever the storage of hydrogen is needed, porous bodies for hydrides, made of sintered spheroidal particles, are especially useful. For example, in undersea applications such hydride bodies would be highly desirable storers of hydrogen where weight of metal is not critical.

In order to provide a better understanding of the details of this process, in the following there are several examples given which are illustrative of the invention. These examples, however, are by no means limitative of the invention and are merely presented for help in describing the particular reaction involved.

EXAMPLE 1

Spherical zirconium particles were prepared by DC arc plasma spraying irregular zirconium particles into an argon atmosphere. These particles were then fabricated into a body by vacuum sintering a mixture of 70 weight percent −100+140 mesh and 30 wt. percent −325+400 mesh spherical particles for 2 hours at 1,400°C. Hydriding was accomplished by heating the body in hydrogen at 550°C. for 1 hour and cooling in hydrogen. The composition of the hydrided body was $ZrH_{1.8}$ and the body was approximately 80 percent of theoretical density.

EXAMPLE 2

Spherical zirconium particles were prepared as in Example 1. These particles were then fabricated into a body by vacuum sintering a mixture of 1 percent −60+80 mesh, 6 percent −80+100 mesh, 49 percent −100+200 mesh, 23 percent −200+325 mesh and 21 percent −325 mesh spherical particles for 2 hours at 1,400°C. Hydriding was accomplished by heating the body in hydrogen at 770°C. for ½ hour and cooling in hydrogen. The composition of the hydrided body was $ZrH_{1.99}$ and the body was approximately 80% of theoretical density.

EXAMPLE 3

Spherical zirconium particles were prepared as in Example 1. These particles were then fabricated into a body by vacuum sintering a mixture of 79 weight percent −80+320 mesh and 21 wt. percent −325 mesh spherical particles for ½ hour at 1,177°C. for 16 ½ hours and cooling in hydrogen. The composition of the hydrided body was $ZrH_{1.58}$ and the body was approximately 78 percent of theoretical density.

This invention has, for the sake of simplicity, been described in terms of a limited number of metals rather than in terms of all of those cited. The inventive concept, however, is to be much broader in that all of the metals cited herein as well as their obvious equivalents, may be hydrided in the manner set forth herein to produce porous hydride bodies. It is to be understood by those skilled in the art that various changes in form, details, and in the substances themselves, may be made herein without departing from the spirit and scope of this invention.

We claim:

1. A coherent porous body capable of repeatedly releasing and absorbing large amounts of hydrogen, said coherent porous body having a gas permeability from about 0.9 to 40 Darcy, comprising the product obtained by (1) compacting spheroidal particles of a metal selected from the group consisting of yttrium, uranium, zirconium, silicon, niobium, platinum, tantalum, calcium, barium, titanium and alloys thereof, (2) sintering the compacted particles together to form a porous matrix, (3) subjecting said matrix to an atmosphere of hydrogen at a temperature and pressure at which formation of the hydride of said metal occurs and at which the body retains its porosity and coherency, and (4) cooling the matrix in a hydrogen atmosphere.

2. A body as set forth in claim 1 having a density on the order of 80 percent of theoretical or greater.

3. A body as set forth in claim 1 wherein the metal hydride is selected from the group consisting of yttrium hydride, uranium hydride, zirconium hydride, titanium hydride and their alloys.

4. A body as set forth in claim 3 having a density on the order of 80 percent of theoretical or greater.

5. A body as set forth in claim 1 wherein the metal hydride is zirconium hydride.

6. A body as set forth in claim 5 having a density on the order of 80 percent of theoretical or greater.

* * * * *